(12) United States Patent
Chheda et al.

(10) Patent No.: US 7,436,950 B2
(45) Date of Patent: Oct. 14, 2008

(54) APPARATUS AND METHOD FOR REAL-TIME POWER DISTRIBUTION MANAGEMENT

(75) Inventors: Sachin Navin Chheda, Roseville, CA (US); Robert William Dobbs, Granite Bay, CA (US); Ricardo E. Espinoza-Ibarra, Carmichael, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1241 days.

(21) Appl. No.: 10/612,523

(22) Filed: Jul. 2, 2003

(65) Prior Publication Data

US 2005/0008146 A1 Jan. 13, 2005

(51) Int. Cl.
*H04M 1/00* (2006.01)
(52) U.S. Cl. ..................................... 379/413
(58) Field of Classification Search ................... 379/413
See application file for complete search history.

(56) References Cited

U.S. PATENT DOCUMENTS

| 5,283,905 | A | * | 2/1994 | Saadeh et al. ............... 713/324 |
| 5,747,889 | A | * | 5/1998 | Raynham et al. ............. 307/80 |
| 5,774,736 | A | * | 6/1998 | Wright et al. ............... 713/330 |
| 6,055,163 | A | * | 4/2000 | Wagner et al. ................. 363/37 |
| 6,153,946 | A | * | 11/2000 | Koch et al. .................... 307/64 |
| 6,418,557 | B1 | | 7/2002 | Otani |
| 6,434,236 | B1 | | 8/2002 | Zorzella |
| 6,560,114 | B2 | | 5/2003 | Berry et al. |
| 6,594,771 | B1 | | 7/2003 | Koerber et al. |
| 6,614,133 | B2 | | 9/2003 | Belson et al. |
| 6,735,704 | B1 | * | 5/2004 | Butka et al. ................. 713/300 |
| 7,058,480 | B1 | * | 6/2006 | Kawanishi et al. .......... 700/286 |

FOREIGN PATENT DOCUMENTS

| JP | 01-290012 | 11/1989 |
| JP | 05-137256 | 1/1993 |
| JP | 07-194118 | 7/1995 |
| JP | 09-288531 | 11/1997 |
| JP | 2001-306189 | 11/2001 |
| JP | 2003-153438 | 5/2003 |
| JP | 2004056918 | 2/2004 |

OTHER PUBLICATIONS

Search Report under Section 17 for EP Application No. GB0414700.5.
"Notice of Rejection" from Japan Patent Office for Patent Application No. 2004-189312, Aug. 14, 2006, 2 sheets.
"Notice of Rejection" from Japan Patent Office for Patent Application No. 2004-189312, Mar. 5, 2007, 4 sheets.
"Decision of Refusal" from Japan Patent Office for Patent Application No. 2004-189312, Dec. 5, 2007, 2 sheets.

* cited by examiner

*Primary Examiner*—Ramnandan Singh

(57) ABSTRACT

One embodiment disclosed relates to an apparatus for supplying redundant power to a plurality of computer systems. The apparatus includes at least one bus bar, a plurality of power supplies each supplying power at a same voltage level, a plurality of power switches, and a power supply management controller. Power inputs of the computer systems are connected to the at least one bus bar. The power supplies are selectively connected to the at least one bus bar using the power switches. The power supply management controller controls the power switches such that the power is supplied redundantly to the computer systems.

28 Claims, 2 Drawing Sheets

APPARATUS AND METHOD FOR REAL-TIME POWER DISTRIBUTION MANAGEMENT

BACKGROUND OF THE INVENTION

1. Field of the Invention

The present invention relates generally to power supplies for electronics and computers.

2. Description of the Background Art

Supplying power with back-up or redundancy to computer systems or servers is desirable or required in certain applications. One conventional solution requires a power supply to be inside of the computer system chassis. If redundancy is desired, then the computer system must either have two power supplies or have a more expensive custom design. Two AC power feeds (one for each power supply) is typically used in providing the redundancy. In addition, these solutions take up valuable system volume in a high-density computer system. Furthermore, the smaller power supplies used are typically plagued by greater inefficiencies, which add up in terms of additional cooling requirements.

Another conventional solution is to use a Telco-style centralized infrastructure for power conversion and distribution. Typically, external AC feeds from multiple sources are routed to a centralized system for power conversion to the appropriate DC power level(s). The converted power is then used to supply power and also to charge a set of batteries for back-up purposes. This type of implementation may work well for a large-scale deployment of servers, such as at a Telco Central Office. However, it does not scale well for smaller deployments, such as compute clusters consisting of one or a few racks of high density computing. Disadvantages of the Telco-style solution include that deployment and maintenance costs are generally high and that common lower cost components are typically not utilized.

The above-described problems and disadvantages may be overcome by utilizing embodiments of the present invention.

SUMMARY

One embodiment of the invention pertains to an apparatus for supplying redundant power to a plurality of computer systems. The apparatus includes at least one power supplying bus bar, a plurality of power supplies, a plurality of power switches, and a power supply management controller. Power inputs of the computer systems are connected to at least one power supplying bus bar. The power supplies are selectively connected to at least one power supplying bus bar using the power switches. The power supply management controller controls the power switches such that the power is supplied redundantly to the computer systems.

Another embodiment of the invention relates to a method for supplying redundant power to a plurality of computer systems coupled to a plurality of bus bars. Status data is received from a plurality of power supplies. If the status data indicates a detrimental condition of a power supply, then a need to re-allocate the power supplies to the bus bars is determined. If the re-allocation is determined as needed, then at least one power supply is switched to supply power via one of the bus bars.

DETAILED DESCRIPTION

Figure 1:
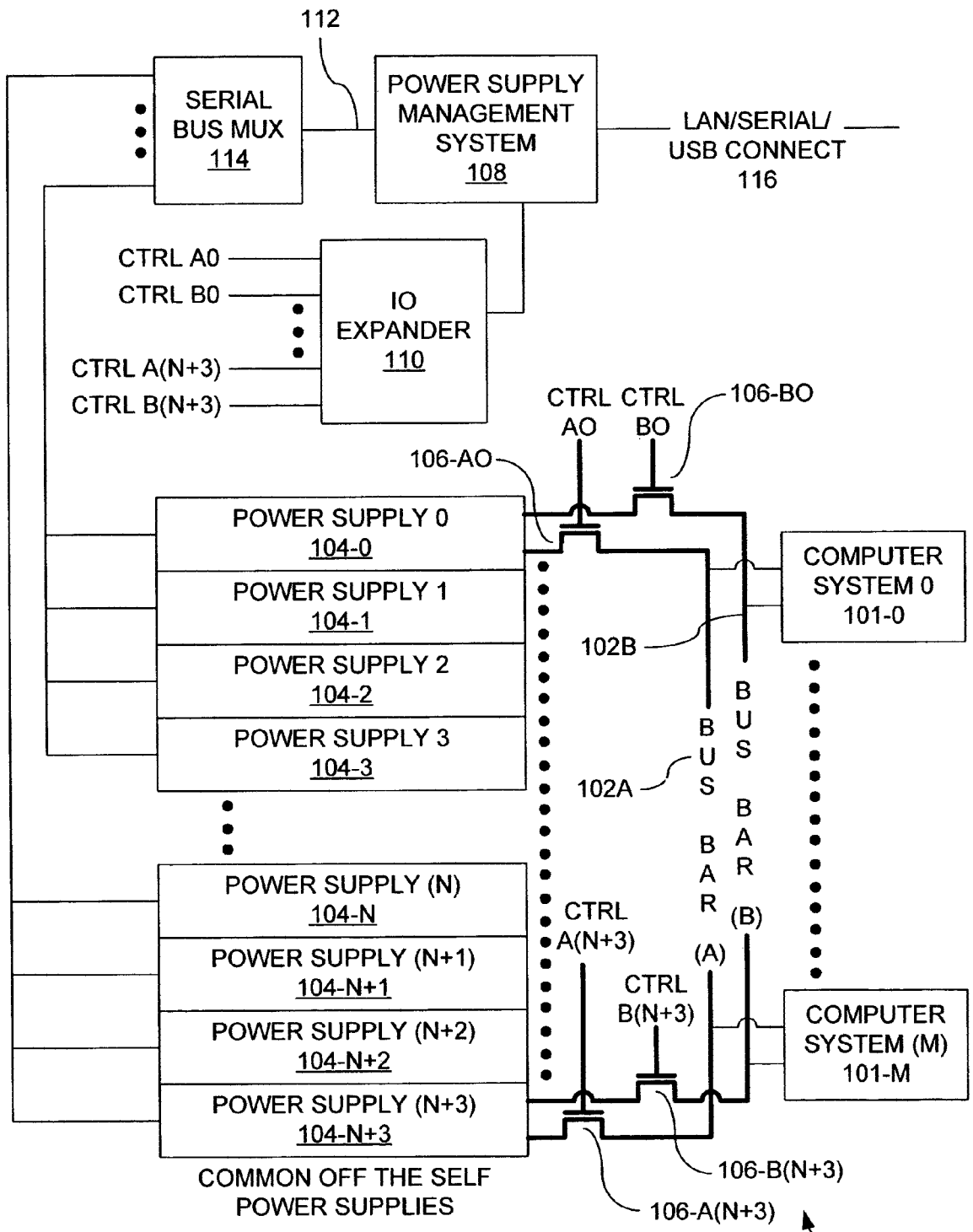
FIG. 1 is a schematic diagram depicting an apparatus for supplying redundant power to a plurality of computer systems in accordance with an embodiment of the invention.

FIG. 1 is a schematic diagram depicting an apparatus 100 for supplying redundant power to a plurality of computer systems 101 in accordance with an embodiment of the invention. The apparatus includes various circuitry, including one or more bus bars 102, a plurality of power supplies 104, a plurality of power switches 106, and a power supply management system 108.

In the specific embodiment illustrated in FIG. 1, power is supplied to M+1 computer systems (101-0 through 101-M). The power is supplied redundantly via two bus bars, bus bar A 102A and bus bar B 102B. The bus bars 102 are conductively connected to the power inputs of the computer systems 101. In this embodiment, each bus bar 102 is connected to each of the M+1 computer systems 101. In other words, each computer system 101 is connected to both bus bars 102.

The power switches 106 selectively connect the multiple power supplies 104 to the bus bars 102. In the illustrated embodiment, each of N+4 power supplies (104-0 through 104-N+3) is coupled by a first power switch 106A to bus bar A 102A and is also coupled by a second power switch 106B to bus bar B 102B. The switches 106 are controlled using control signals [Ctrl A0, Ctrl B0, Ctrl A1, Ctrl B1, Ctrl A2, Ctrl B2, . . . , Ctrl A(N+3), Ctrl B(N+3)] determined by the power supply management controller. For example, when the control signal Ctrl AX turns on the power switch 106-AX, then power is supplied from the power supply 104-X to the bus bar A 102A. On the other hand, when the control signal Ctrl AX turns off the power switch 106-AX, then power is not supplied from the power supply 104-X to the bus bar A 102A. A power supply 104 may be switched to supply one or more bus bars 102, or be switched off to supply none of the bus bars 102.

The multiple power supplies 104 may each provide power at a same voltage level. For example, the power supplies 104 may each supply a standard voltage, such as 48 volts or −48 volts. Of course, the particular voltage supplied will vary depending on the voltage needed by the computer systems 101 or other systems being powered. To implement a bank of power supplies at low cost, common off the shelf (COTS) power supplies may be utilized. In one implementation, the power supplies 104 may each have a same power capacity (wattage). In another implementation, the wattage of the power supplies 104 may be non-uniform. In that instance, the power supply management controller would be configured to have information about the wattage of each power supply 104 so as to be able to effectively utilize the different capacities in providing power to the devices.

The power supply management system 108 includes a power supply management controller and system memory. The power supply management controller controls the power switches 106 such that the power is supplied redundantly to the computer systems 101. In the illustrated embodiment, the power supply management controller is coupled to the control inputs of the power switches 106 by way of an input/output (I/O) expander device 110. In addition, the power supply management system 108 may also have the capability of turning on/off each power supply 104. The power supply management system 108 is advantageously centralized and can be incorporated into and managed from system management tools, such as, for example, HP OpenView®, available from the Hewlett-Packard Company, or other system management tools.

The power supply management system 108 is also coupled communicatively to each of the power supplies 104. In the illustrated embodiment, the power supply management controller is coupled to the power supplies 104 by way of a serial bus 112 and a serial bus multiplexer 114. The multiplexer 114 multiplexes signals from the power supplies 104 into a serial signal to the controller. The serial bus may be, for example, an I$^2$C bus, or a USB (universal serial bus), or a RS232 standard bus, or other serial buses. The I$^2$C bus is a bidirectional 2-wire bus. Alternatively, another type of communication means may be used, such as a parallel bus.

Status information from the power supplies 104 is communicated through the bus or other communication means to the power supply management controller. The status information may include, for example, a power good signal, a voltage level, a current level, and a temperature from a power supply 104. A power sensor at each power supply may measure the power voltage and current levels. A temperature sensor may be used to supply the temperature data. A Field Replaceable Unit (FRU) EEPROM at the power supply 104 may be used to identify a particular supply 104 to the power supply management system 108. The status data may be stored in data memory within the power supply management system 108.

In one example, the status information may be retrieved by way of a polling type mechanism. With such a polling mechanism, the controller would periodically send a status request to each of the power-supplies 104, and the power supplies would respond by sending back the requested status information. The order of the polling may be by round robin or other scheduling algorithm. In another example, the status information may be received by way of an interrupt type mechanism. With such an interrupt mechanism, a power supply 104 with a change of status would send an interrupt message with the status information to the controller, and an interrupt handler routine in the power supply management system 108 would process and initiate a response to the interrupt message.

In the illustrated embodiment, two power supplying bus bars 102 are shown. In another embodiment, only one bus bar 102 is utilized. In other embodiments, three or more bus bars 102 may be used. Using more than one bus bar 102 advantageously provides redundancy in case a bus bar 102 is shorted to ground or otherwise disabled.

In the illustrated embodiment, each of the power supplying bus bars 102 is coupled to each computer system 101 and via switches 106 to each power supply 104. In other embodiments, a bus bar 102 may be coupled to two or more, but not necessarily to all, power supplies 104. In other embodiments, a computer system 101 may be coupled to two or more, but not necessarily to all, bus bars 102. In other embodiments, a power supply 104 may be coupled to two or more, but not necessarily to all, bus bars 102.

In one embodiment, the computer systems 101 may be mounted in a rack. The bus bar(s) 102 may be advantageously integrated into such a rack. Such an intra-rack redundant power system may be implemented more affordably than costly Telco-style power systems.

In one embodiment, the locations of the plurality of power supplies 104 may be consolidated such that a consolidated cooling system (or a few such systems) may be advantageously utilized to cool them. The use of the one or more bus bars 102 to distribute power enables this consolidation. In contrast, a conventional system typically has power supplies 104 are distributed in location (for example, one in or near each computer system 101), so that the cooling system must also be distributed. In an alternate embodiment, each power supply 104 may have its own cooling system (particularly if the power supply is a COTS component that includes its own built-in cooling system).

In one embodiment, the switches 106 may comprise high-current, high-voltage field effect transistors (FETs). If the power switching is not fast enough, detrimental gaps may appear in the power supplied to the computer systems 101. Hence, the FETs may be selected to be sufficiently fast so as to avoid such detrimental gaps. In other embodiments, other forms of switches may be utilized. For example, controllable electromagnetic relays or controllable DC circuit breakers may be used.

In one embodiment, the apparatus may be configured to include a communications channel 116 between the computer systems 101 and the power supply management system 108. For example, the communications channel 116 may comprise a local area network (LAN) connection, or a serial bus, such as a USB, connection. The communications channel 116 may be used advantageously to communicate power usage information from the computer systems 101 to the power supply management controller. In such an embodiment, the power supply management system 108 can make its switching determinations not only using power supply data, but also using power consumption data. For example, a brown out condition may occur when the power demand of a computer or server is insufficiently met by the power supply system. The brown out condition at a computer system 101 may be communicated to the power supply management system 108, and the power supply management system 108 can respond by switching more power to that system 101.

In one embodiment, the power supply management controller may utilize a predictive failure type algorithm. Such an algorithm utilizes status data from a power supply 104 in order to predict a potential upcoming failure of the power supply 104. For example, increasing temperature and increasing noise in the supplied power may indicate a likely upcoming failure of a power supply 104.

Figure 2:
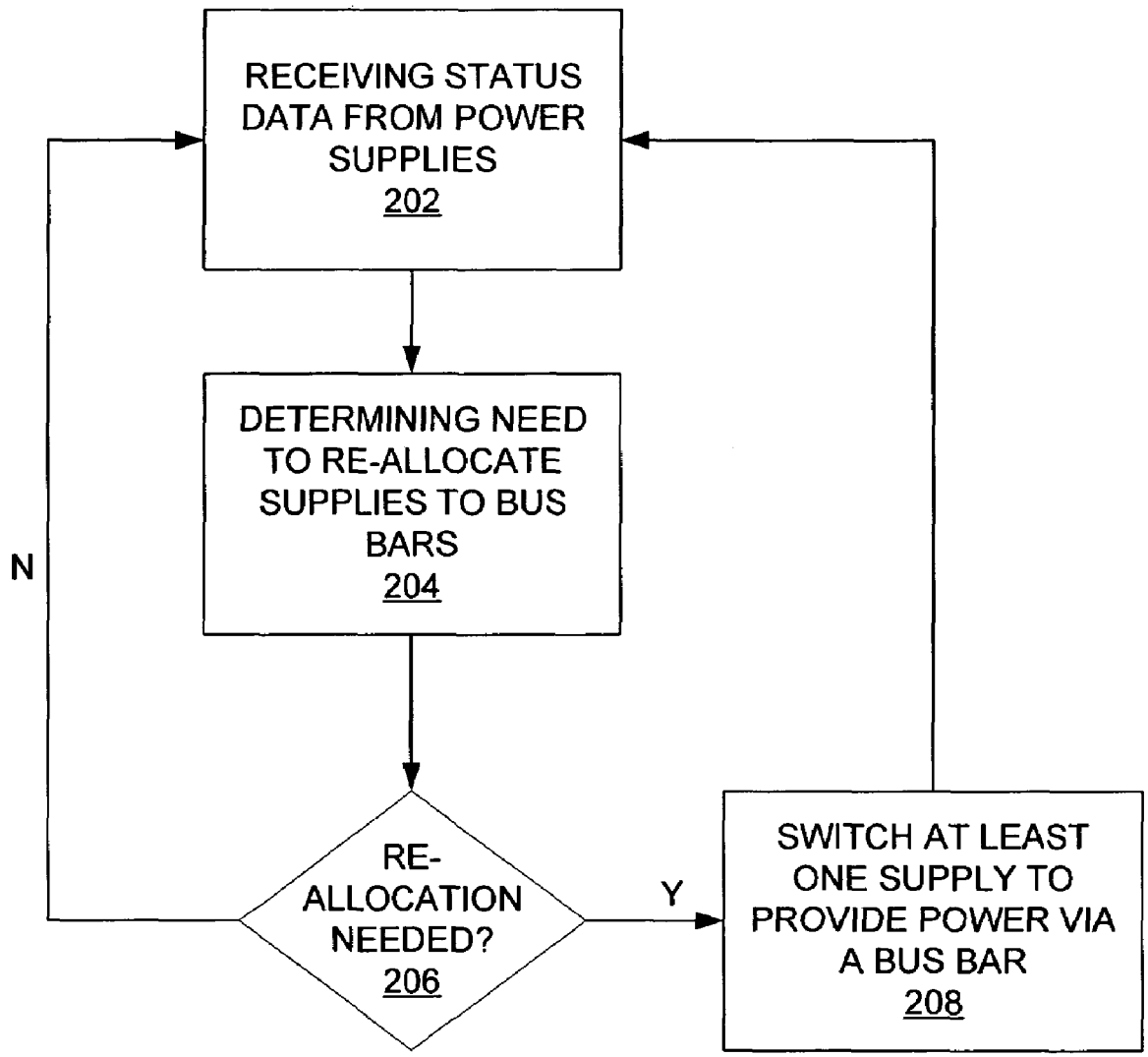
FIG. 2 is a flow chart depicting a method for supplying redundant power to a plurality of computer systems in accordance with an embodiment of the invention.

FIG. 2 is a flow chart depicting a method 200 for supplying redundant power to a plurality of computer systems in accordance with an embodiment of the invention. This method 200 utilizes a plurality of bus bars to supply power to the computer systems. For example, a first set of computer systems may be powered by a first bus bar, and a second set of computers may be powered by a second bus bar.

Status data is received 202 from a plurality of power supplies. The power supplies are controllably coupled to the bus bars by way of power switches. The status data may include, for example, a power good signal, a temperature reading, and the voltage and current levels of the power being supplied. A power sensor at each power supply may be used to measure the voltage and current levels, and a temperature sensor may take the temperature reading.

The power supply management system uses the status data to determine 204 whether or not the power supplies need to be re-allocated to the bus bars. This determination is made if the status data indicates a detrimental condition at one or more power supplies.

If the re-allocation is determined to be needed 206, then at least one power supply is switched 208 to supply power via one of the bus bars. For example, let us say that two x watt supplies are powering the first bus bar and a single y watt supply is powering the second bus bar. If the y watt supply fails, then the system may switch one x watt supply from the first bar to the second bar. In one embodiment, predictive failure analysis may be applied to the status data. Such predictive analysis may be applied to predict an upcoming failure of a power supply. If such an upcoming failure is predicted as a potential problem, then the need to re-allocate the power supplied to the bus bars may be evaluated. If the re-allocation is anticipated to be needed, then one or more power supplies may be switched from one bus bar to another bus bar in order to preemptively re-distribute the power supplies appropriately. Other embodiments may not apply such predictive analysis.

In one embodiment, the allocation of the power supplies may use additional rules and criteria. For example, a rule may be that power supplies connected to a certain AC breaker may be distributed equally across one bus bar. Various other rules and criteria may be used.

In one embodiment, additional status data relating to power consumption from the computer systems may be received by the power supply management system. Such additional status data may be used to further determine the need to re-allocate the power supplies to the bus bars. For example, a brown out condition at one computer system may trigger such a re-allocation.

In one embodiment, if a server fails and shorts out the power, then that server can be advantageously isolated from the corresponding switches 106 onwards by putting those corresponding switches 106 in an open circuit state. This prevents that server affecting the rest of the servers/computer systems.

In one embodiment, prioritization factors may be taken into account in determining whether the re-allocation is needed and how the re-allocation is performed. For example, one computer system may be set at a higher priority than another. In other words, it may be more important to keep certain computer systems up and running, while other computer systems may be of lower priority. In that case, the determination would re-allocate power supplies as needed to first provide power to the higher priority computer systems.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. An apparatus for supplying power to a set of servers or computer systems, the apparatus comprising:
   a chassis for each said computer system;
   at least one power supplying bus bar to which power inputs of the computer systems are connected, said at least one bus bar being external to said computer system chassis;
   a plurality of power supplies which are external to said computer system chassis;
   a plurality of power switches, each power switch configured between one of said power supplies and said at least one bus bar, for selectively connecting the power supplies to said at least one bus bar; and
   a power supply management controller configured to control the power switches such that the power is supplied redundantly to the computer systems.

2. The apparatus of claim 1 comprising at least two bus bars such that further redundancy is provided.

3. The apparatus of claim 2, wherein a computer system is connected to the at least two bus bars.

4. The apparatus of claim 2, wherein a power supply is coupled via the switches to at least two bus bars.

5. The apparatus of claim 1, further comprising:
   an expander device for coupling the power supply management controller to control inputs of the power switches.

6. The apparatus of claim 1, wherein each power supply includes a power sensor that measures at least voltage and current of power supplied, and wherein the power supply management controller is further configured to receive status information from the power supplies.

7. The apparatus of claim 6, wherein the status information is retrieved by way of a polling type mechanism.

8. The apparatus of claim 6, wherein the status information is received by way of an interrupt type mechanism.

9. The apparatus of claim 6, further comprising:
   a serial bus multiplexer for multiplexing signals from the plurality of power supplies into a serial signal to the power supply management controller.

10. The apparatus of claim 1, wherein the plurality of power supplies each supply power at a same voltage level.

11. The apparatus of claim 10, wherein the plurality of power supplies are of non-uniform power capacities (wattage).

12. The apparatus of claim 10, further comprising:
   a rack onto which the computer systems are mounted, wherein the plurality of bus bars are integrated into the rack.

13. The apparatus of claim 1, further comprising:
   a consolidated cooling system for cooling the plurality of power supplies.

14. The apparatus of claim 1, wherein the power supplies have built-in cooling systems.

15. The apparatus of claim 1, wherein the switches comprise field effect transistors of sufficiently high speed to avoid detrimental gaps in power supplied.

16. The apparatus of claim 1, wherein the switches comprise controllable electromagnetic relays.

17. The apparatus of claim 1, wherein the switches comprise controllable circuit breakers.

18. The apparatus of claim 1, further comprising:
   a communications channel between the computer systems and the power supply management controller for communicating power usage information from the computer systems to the power supply management controller.

19. The apparatus of claim 1, wherein a bus bar is coupled via the switches to at least two power supplies.

20. A method for supplying redundant power to a plurality of computer systems coupled to a plurality of bus bars, the method comprising:
   receiving status data from a plurality of power supplies;
   determining a need to re-allocate the power supplies to the bus bars if the status data indicates a detrimental condition of a power supply; and
   switching at least one power supply to supply power via one of the bus bars if the re-allocation is determined to be needed.

21. The method of claim 20, wherein the status data is requested periodically by way of polling.

22. The method of claim 21, wherein the polling comprises round robin type scheduling.

23. The method of claim 20, wherein the status data is received by way of interrupts.

24. The method of claim 20, further comprising:
applying predictive failure analysis to the status data to predict an upcoming failure of a power supply.

25. The method of claim 24, further comprising:
evaluating an anticipated need to re-allocate the power supplies to the bus bars in event of the upcoming failure; and
preemptively switching at least one power supply to supply power via one of the bus bars if the re-allocation is anticipated to be needed.

26. The method of claim 20, further comprising:
receiving additional status data relating to power consumption from the plurality of computer systems.

27. The method of claim 20, wherein said determining takes into account prioritization factors.

28. A system for supplying redundant power to a plurality of computer systems coupled to a plurality of bus bars, the system comprising:
means for receiving status data from a plurality of power supplies;
means for determining a need to re-allocate the power supplies to the bus bars if the status data indicates a failure condition of a power supply; and
means for switching at least one power supply to supply power via one of the bus bars if the re-allocation is determined to be needed.

* * * * *

UNITED STATES PATENT AND TRADEMARK OFFICE
CERTIFICATE OF CORRECTION

PATENT NO. : 7,436,950 B2  Page 1 of 1
APPLICATION NO. : 10/612523
DATED : October 14, 2008
INVENTOR(S) : Sachin Navin Chheda et al.

It is certified that error appears in the above-identified patent and that said Letters Patent is hereby corrected as shown below:

In column 2, line 16, delete "101-O" and insert -- 101-0 --, therefor.

In column 2, line 26, delete "104-O" and insert -- 104-0 --, therefor.

Signed and Sealed this

Thirty-first Day of March, 2009

JOHN DOLL
*Acting Director of the United States Patent and Trademark Office*